United States Patent [19]

Silverstein

[11] Patent Number: 5,262,789

[45] Date of Patent: Nov. 16, 1993

[54] SOURCE IDENTIFICATION SYSTEM FOR CLOSELY SEPARATED SPATIAL SOURCES

[75] Inventor: Seth D. Silverstein, Schenectady, N.Y.

[73] Assignee: General Electric Company, Schenectady, N.Y.

[21] Appl. No.: 876,957

[22] Filed: Apr. 30, 1992

[51] Int. Cl.$^5$ ............................................. H01Q 3/22
[52] U.S. Cl. ...................................... 342/368; 342/378
[58] Field of Search ............... 342/368, 378, 383, 384, 342/13

[56] References Cited

U.S. PATENT DOCUMENTS 4,754,282  6/1988  Edelblute et al. ............... 342/378 X
5,049,795  9/1991  Moulds, III ...................... 342/378 X

OTHER PUBLICATIONS

R. O. Schmidt, "Multiple Emitter Location and Signal Parameter Estimation", Mar. 1986, IEEE Trans. Antennas and Propagation, vol. AP-34, pp. 276-280.

S. D. Silverstein and M. D. Zoltowski, "The Mathematical Basis for Element and Fourier Beam Space MUSIC and Root-MUSIC Algorithms", Jul. 1991, Digital Signal Processing, vol. 1, pp. 161-175.

R. Roy, A. Paulraj, and T. Kailath, "ESPRIT-A Subspace Rotational Approach to Signal Parameter Estimation", Oct. 1986, IEEE Trans. Acoust. Speech Signal Process, vol. ASSP-34, pp. 1340-1342.

M. Wax and T. Kailath, "Detection of Signals by Information Theoretic Criteria", Apr. 1985, IEEE Trans ASSP, vol. 33, pp. 387-392.

U.S. Patent Application, "Small Target Doppler Detection System", Seth David Silverstein and Robert L. Nevin, Ser. No. 876,958 filed Apr. 30, 1992.

Primary Examiner—Mark Hellner
Attorney, Agent, or Firm—Lawrence P. Zale; Marvin Snyder

[57] ABSTRACT

A phased array source identification receives signals from remote sources and determines direction of arrival angles and the respective powers of coherent electromagnetic signals for the purpose of spatial localization and identification of relatively low power coherent sources in the presence of other coherent sources of relatively large signal power. The system employs covariant analysis of the received signals followed by eigenanalysis to produce eigenvectors and eigenvalues. A superresolution algorithm creates array manifold vectors corresponding to source direction of arrival, that lie in the signal subspace of the eigenvectors. In radar applications low power sources correspond to targets, while the high power sources would correspond to jammers. The relative power of radar echoes contribute information relevant to the identification of real sources as opposed to false alarms. Other applications may include cellular telephone systems and sonar systems.

9 Claims, 4 Drawing Sheets

SOURCE IDENTIFICATION SYSTEM FOR CLOSELY SEPARATED SPATIAL SOURCES

CROSS REFERENCES TO RELATED APPLICATIONS

Reference is made to related application "SMALL TARGET DOPPLER DETECTION SYSTEM" Seth David Silverstein and Robert L. Nevin Ser. No. 876,958 filed simultaneously with this application and assigned to the present assignee.

BACKGROUND OF THE INVENTION

1. Field of the Invention

The invention relates to phased array detection systems and radio communications systems.

2. Description of Related Art

Phased arrays are used in radar systems to receive electromagnetic signals that are transmitted from or reflected from objects at a distance. Phased array systems employ a plurality of sensors distributed over a surface which detects the electromagnetic signals from the sources. Array geometries can be either one or two dimensional. Cellular telephone systems may employ phased arrays to receive signals emanated from distant transmitters. Ultrasound imaging systems may employ phase array receiver to locate reflected ultrasound. In a digital phased array system, the signals incident upon the phased array are sampled and digitized at successive instants in time for each of the sensor elements. The digitized signals are processed in order to produce solutions estimating the direction of arrival (DOA) of signals transmitted or reflected from the sources.

The digital signals detected by the sensors can be processed by superresolution analyzers. Superresolution analyzers in the spatial domain solve for the direction of incoming narrow band signals from sources that have small angular separations, usually less than a Rayleigh resolution. The Rayleigh resolution for a narrow band electromagnetic signal of central wavelength $\lambda$, incident on a linear array of length L, is given by $\lambda/L$. For a linear array with M elements each separated by $\lambda/2$ the Rayleigh angular resolution is $\delta\theta \approx 2/M$.

Significant advances have been made in recent years in the development of superresolution analyzers employing phased arrays that can accurately estimate the DOA of point sources. Electromagnetic or acoustic waves arising from distant sources behave as plane waves incident upon the array. Near optimal performance results for the DOA estimates are exhibited by the subspace array processing algorithms such as, for example, the MUSIC algorithm (See "Multiple Emitter Location and Signal Parameter Estimation", R. O. Schmidt, IEEE *Trans. Antennas and Propagation*, Vol. AP-34, pp. 276-280, March 1986), the Root-MUSIC algorithm, (See "The Mathematical Basis for Element and Fourier Beam Space MUSIC and Root-MUSIC Algorithms", S. D. Silverstein and M. D. Zoltowski, *Digital Signal Processing*, Vol. 1 pp. 161-175, July 1991), and the ESPRIT alogorithm (See "ESPRIT—A Subspace Rotational Approach to Signal Parameter Estimation", R. Roy, A. Paulraj, and T. Kailath, IEEE *Trans. Acoust. Speech Signal Process* vol. ASSP-34, pp. 1340-1342, October 1986).

Although the present superresolution analyzer compute the DOA of sources, they do not compute their relative signal strengths or the signal to noise ratios of the sources. In radar applications this information may be useful in reducing false alarms in the identification of real targets. This information is especially important for discerning sources that emit signals of relative low power that have bearing angles that are in close proximity to the bearing angles of sources that emit signals of relative high power such as electronic countermeasure jammers.

In communication applications, it is important to know both the DOA and relative powers of communicating sources to select the correct source to decode a proper message.

Currently, there is a need for a method that determines both the DOA of sources as well as their relative signal strengths.

SUMMARY OF THE INVENTION

A source identification system identifies proper sources by estimating the direction of arrival (DOA) angles and the signal to noise ratios of a number of distant radiation sources or objects reflecting transmitted radiation. A spatial phased array senses a signal from the sources. The sensed signal represents a superposition of signals of varying power sources. At successive intervals of time the signal incident upon the phased array is sampled and digitized for each of the sensor elements. A complete set of data taken at a given instant across the whole array is referred to as a "snapshot" of the signal. Data from each sensor element value is captured for a number of uncorrelated snapshots. A covariance generation unit constructs a sample covariance matrix from the data from all the sensors over a number of uncorrelated snapshots. For an array with M elements, the sample covariance matrix will be an $M \times M$ matrix. An eigenanalysis processor generates a set of eigenvectors and eigenvalues from the sample covariance matrix. This results in two orthogonal subspaces referred to as a signal subspace and a noise subspace. The sources can be represented as vectors. These source vectors are primarilly contained within the signal subspace, hence they are approximately orthogonal to the noise subspace and may be separated. Once they are separated, the relative powers of the sources may be determined. A source number estimator determines the number of sources from the eigenvectors. A DOA processor estimates DOA for the number of sources by employing a superresolution algorithm. A power estimation processor performs analysis based upon the effects of fluctuations due to finite data sampling on the sample covariance matrix. A target detection logic unit identifies sources to be tracked based upon the DOA and signal to noise ratio of the source. A signal synthesis and decoding unit processes the identified signals and suppresses undesired sources for presentation on an output device.

The present invention provides a measure of the relative power of sources along with their bearing angles allowing identification of sources such as relatively low power coherent sources in the presence of other coherent sources of relatively large signal power. This commonly is the situation in radar systems when high power sources corresponding to signal countermeasure (jammers) are applied to mask low power sources corresponding to targets.

OBJECTS OF THE INVENTION

It is an object of the present invention to provide an estimation of the relative powers of signals from distant sources.

It is another object of the present invention to determine the direction of arrival and identify low power sources that are in close bearing angle proximity to sources that have much larger powers.

It is another object of the present invention to determine the direction of arrival and identify low power sources that are in close bearing angle proximity to electronic countermeasure jammers.

It is another object of the present invention to use direction of arrival information and signal to noise ratio estimates for selection of specific communication sources in a communication system.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
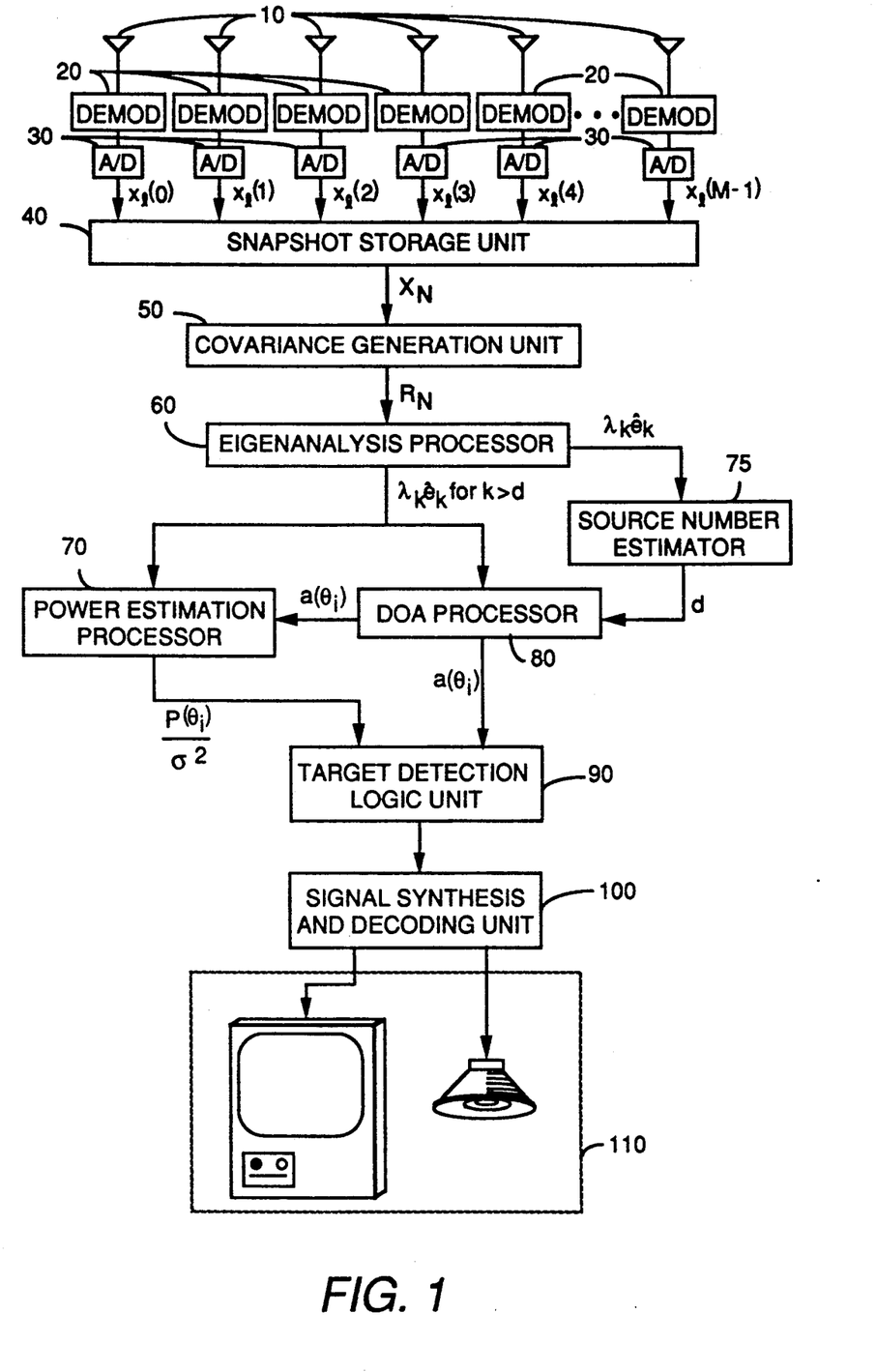
FIG. 1 is a block diagram of a source identification system according to the present invention.
Figure 2:
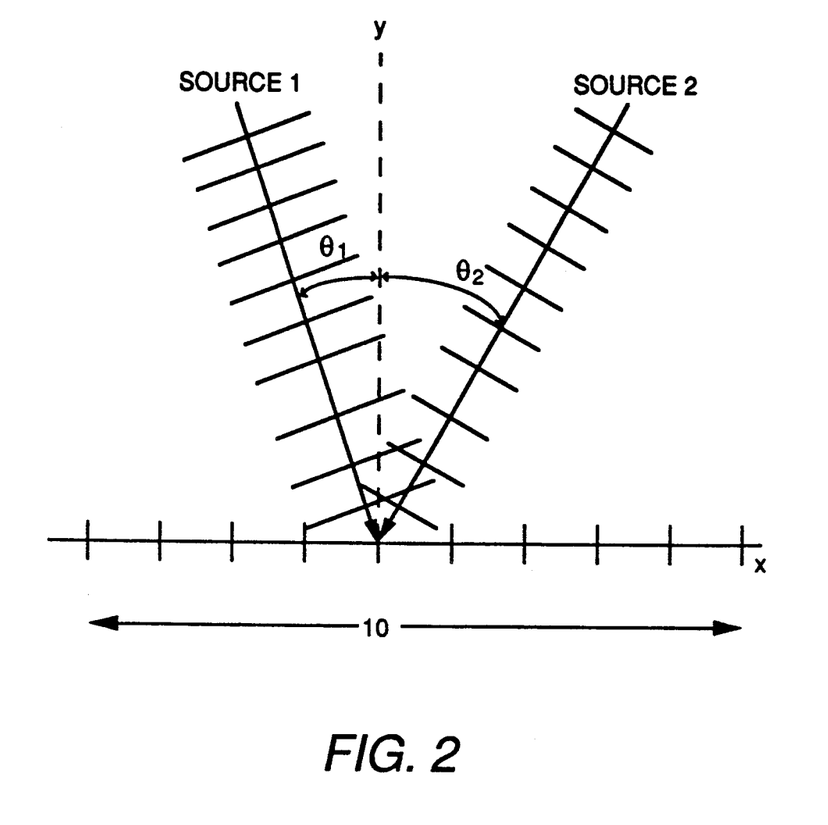
FIG. 2 illustrates the received direction of arrival of two electromagnetic signals received by a phased array from two sources having bearing angles $\theta_1$ and $\theta_2$.

A source identification system shown in FIG. 1 estimates the power of transmitted or reflected signals from a number of remote sources incident upon a phased array 10 having M elements. In the preferred embodiment, the superresolution analyzer is a pulsed radar system where radiation is transmitted as narrow band signals having modulation bandwidths $\Delta\omega$ that are small compared to the carrier frequencies, $\omega_c$, i.e., $\Delta\omega/\omega_c << 1$. In pulsed radar systems, a radiation pulse is transmitted toward a number of sources allowing enough time for the transmitted radiation to reach a number of sources to be identified, and reflect back to the system before transmitting a subsequent radiation pulse. The spacing between array sensor elements 10 are set at $\frac{1}{2}$ the carrier wavelength ($\lambda_c$). Incident radiation transmitted from, or reflected from two distant coherent sources shown in FIG. 2 have bearing angles $\theta_1$, $\theta_2$, relative to the phased array 10. Phased array sensors 10 create coherent signals upon receiving radiation from the sources. This signal is sampled at the array at specific instants of time $t_l$. In FIG. 1, each sample is individually modulated down to baseband by a demodulator 20 and digitized by an analog-to-digital (A/D) converter 30 to a value $x_l(n)$ where n is an index representing a sensor 10, and l is an index representing the snapshot number taken after the lth time interval. A set of digitized samples for all sensors of the phased array is called a "snapshot". For a pulsed radar, the snapshot interval is equal to the reciprocal of the pulse repetition frequency. For most situations the pulse intervals will be sufficiently long for the snapshots to be at least partially decorrelated. The decorrelation of the emitter signals from snapshot to snapshot is physically brought about the motion of the emitter source in the time interval between the snapshots. If the source moves by a distance that is the order of the carrier wavelength or larger in the time period between snapshots, a random phase will be associated with the captured snapshot signals. The decorrelation nature of these phases establishes the decorrelation of the signals.

The digitized values lth snapshot can be conveniently stored in a vector format as:

$$x_l = [x_l(0), x_l(1) \ldots x_l(M-1)]. \qquad (1)$$

The M components of $x_l$ correspond to the complex representation of the signal received at time interval l. Values from multiple snapshots are accumulated by a snapshot storage unit 40 and each digitized value separately stored in a data matrix $X_N$ within snapshot storage unit 40, where the columns of the data matrix correspond to the individual snapshot vectors $x_l$.

Each of the signals received by the phased array conveys information about the physical parameters of the source. The physical parameters of interest in this invention are the DOA angles and the mean powers of the signals from the emitting sources. The signals received at the array sensor elements are different for different uncorrelated snapshots. This difference is due to the fact that some physical processes that influence the received signals vary in time in a random statistical manner. Accordingly, the physical parameters of interest such as DOA angles and signal to noise ratio of the sources are statistical quantities that must be determined by statistical estimation techniques. In statistical analyses, the data corresponding to random processes is accumulated in a digital format and cross correlated to extract the desired statistical information. The cross correlation of the data is usually organized in matrix format known as a sample covariance matrix.

Covariance generation unit 50 manipulates digitized values of the data matrices $X_N$ to produce products referred to in the art as the matrix outer product. For N snapshots, the sample covariance matrix $R_N$ is a Hermitian matrix having M×M individual matrix elements where M is the number of phased array sensors 10, and $R_N(m, n)$ corresponds to the mth row and nth column given by:

$$R_N(m, n) = \frac{1}{N} \sum_{l=1}^{N} x_l(m) x_l^*(n) \qquad (2)$$

where $x_l^*(n)$ represents the complex conjugate of the digitized values $x_l(n)$. The matrix elements of the sample covariance matrix $R_N$ for N snapshots are constructed from the average of the corresponding matrix elements all the individual snapshot autocorrelation matrices.

The information necessary to obtain the most probable value of the physical parameters is contained in the structure of the sample covariance. This information can be extracted by a variety of algorithmic techniques that typically utilize some aspect of the mathematical eigenstructure of the sample covariance matrix. An Mth order covariance matrix will possess M eigenvectors such that the product of the matrix with one of its eigenvectors produces a constant times the eigenvector. The constant is known as an eigenvalue of the matrix corresponding to the specific eigenvector. All the eigenvectors in a matrix multiplication sense are orthogonal to each other.

Eigenanalysis processor 60 then performs eigenanalysis on the sample covariance matrix. For an Mth order array, the M×M sample covariance matrix will have M eigenvectors that satisfy the matrix equation, $$R_N \hat{e}_k = \hat{\lambda}_k \hat{e}_k. \tag{3}$$

Here $\hat{\lambda}_1 \geq \ldots \hat{\lambda}_M$ are the eigenvalues and $\hat{e}_1, \ldots, \hat{e}_m$ are the corresponding eigenvectors of $R_N$. The eigenvectors of $R_N$ are an orthonormal set of basis vectors, $\hat{e}_m^H \hat{e}_n = \delta_{mn}$. For an infinite number of decorrelated snapshots, eigenvectors $\hat{e}_1, \ldots, \hat{e}_M$ of the asymptotic form of sample covariance matrix $R_N$ can be divided into two orthogonal subspaces referred to as the signal and noise subspaces. The signal subspace has dimension d corresponding to the d sources, while the orthogonal noise subspace will have dimension M−d. For an infinite number of snapshots, the noise subspace eigenvalues will all be equal to $\sigma^2$, the average noise power per element.

A source number estimator 75 received the eigenvectors and eigenvalues from eigenanalysis processor 60 and determines the number of sources d. Source number estimator 75 may determine the number of sources according to a source order estimation algorithm well known in the art such as described in "Detection of Signals by Information Theoretic Criteria", M. Wax and T. Kailath, IEEE Trans ASSP, Vol. 33, pp. 387-392, April 1985.

A set of signal vectors from all possible sources that can be received by phased array 10 is referred to in the art as the "array manifold". There is a distinct vector in array manifold $a(\theta)$ for every possible direction of arrival angle $\theta$. As there are an infinite number of possible direction of arrival angles, there are an infinite number of array manifold vectors in the array manifold. For a situation with d real uncorrelated sources, with specific direction of arrival bearing angles, $\theta_1, \theta_2 \ldots \theta_d$ there are d source array manifold vectors, $a(\theta_1), \ldots, a(\theta_d)$, contained within the total array manifold.

In the limit of an infinite number of decorrelated snapshots, the d source array manifold vectors lie entirely within the signal subspace and are orthogonal to the noise subspace. For a finite number of snapshots, the source array manifold vectors are only approximately orthogonal to the noise subspace.

A DOA processor 80 employs a conventional DOA estimation techniques such as, for example, MUSIC, Root MUSIC, or ESPRIT to determine the direction of arrival from the number of sources d and the eigenvalues and eigenvectors. DOA processor 80 estimates the DOA angles by finding the d specific array manifold vectors that are most orthogonal to the noise subspace. Once the DOA angles are accurately estimated, a set of array manifold vectors, each corresponding to a source, are created by DOA processor 80. For d sources with DOA angles $\theta_1, \theta_2 \ldots \theta_d$, the d source array manifold vectors contained within the total array manifold have the functional form:

$$a(\theta_i) = \frac{1}{\sqrt{M}} [z^0, z^1, \ldots z^{M-1}]^T, \tag{4}$$

with $z_q^i = e^{j2\pi q f_i}$ where $q = 0, 1, \ldots, M-1$. The spatial frequencies of the sources, $f_i$, are defined in terms of the source bearing angles by $$f_i = \tfrac{1}{2}\sin(\theta_i).$$

For finite snapshot numbers, the explicit functional dependence on the system parameters of the finite projections of the source array manifold vectors $a(\theta_i)$ onto the noise subspace provides the necessary information to determine the relative source powers. A power estimation processor 70 performs computational analysis based upon fundamental considerations of the effects of fluctuations due to finite data samples on the mathematical structure of sample covariance matrix $R_N$. DOA processor 80 creates a frequency spectrum that is equal to the reciprocal of the square of the value of the projection of the array manifold vectors $a(\theta_i)$ onto the noise subspace eigenvectors $\hat{e}_k$. The non-orthogonality of the source array manifold vectors $a(\theta_i)$ for finite number of sources implies that the values of the frequency spectrum at the source spatial frequencies will be finite.

For signals from d sources received by an M element phased array, the frequency spectrum $S(\theta_i)$ evaluated at accurate DOA estimates $\{\theta_i\}$, approximately fits the relation:

$$S(\theta_i) \approx \frac{P_i M N}{\sigma^2 (M - d)} \tag{5}$$

Here N is the number of uncorrelated snapshots;

$$\left( \frac{P(\theta_i)}{\sigma^2} \right)$$

are the mean values of the source powers represented by their signal to noise ratios; and $\sigma^2$ is the noise power per receiver element. Power estimation processor 70 estimates the power directly by fitting the value of the frequency spectrum calculated from the data to the functional relation given by Eq. 5.

Power estimation processor 70 estimates the signal to noise ratio of the sources by projecting the source array manifold vectors $a(\theta_1), a(\theta_2) \ldots a(\theta_d)$ onto each corresponding approximate noise subspace eigenvector $\hat{e}_k$ of sample covariance matrix $R_N$ where $k > d$. The square magnitude of this projection is represented by $D(\theta_i)$, $$D(\theta_i) = \sum_{k=M-d+1}^{M} |a^H(\theta_i)\hat{e}_k|^2 \tag{6}$$

where $D(\theta_i)$ is the reciprocal of the frequency spectrum, $$D(\theta_i) = \frac{1}{S(\theta_i)}.$$

Power estimation processor 70 calculates the projection of the estimated source array manifold vectors $a(\theta_i)$ onto the approximate noise subspace eigenvectors $\hat{e}_k$ of the sample covariance matrix $R_N$. Since $$D(\theta_i) \approx \frac{\sigma^2(M-d)}{P(\theta_i)MN}$$

can be derived from Eq. 6, the estimated signal to noise ratios of the sources $$\left(\frac{P(\theta_i)}{\sigma^2}\right)_{est},$$

follows directly from Eq. (6), using the stored calculated values of the array manifold $a(\theta_i)$ vectors and the approximate noise eigenvectors $\hat{e}_k$. Here, $$\left(\frac{P(\theta_i)}{\sigma^2}\right)_{est} = \frac{(M-d)}{MN} \frac{1}{D(\theta_i)} \quad (7)$$

In an alternative embodiment, power estimation processor 70 can estimate the signal powers using a subset of the noise subspace. For example, for any single noise eigenvector one can use the approximate relation:

$$\left(\frac{P(\theta_i)}{\sigma^2}\right)_{est} \approx \frac{1}{MN} \frac{1}{|a^H(\theta_i)\hat{e}_k|^2}, \text{ for } k > d \quad (8)$$

A target detection unit 90 receives the array vectors $a(\theta_i)$ indicating the DOA of each source, and the power of each source $P(\theta_i)$ from DOA processor 80 and power estimation processor 70, respectively. Target detection unit 90 determines which sources to track, and which sources to ignore based upon its input. For example, the power of a reflected radar signal from a bird will usually be considerably lower than the echo from an aircraft at a comparable range. Also electronic countermeasure jammers transmit significantly greater power than a target. Target detection unit 90 separates the signal which are to be tracked from those that are to be ignored, and passed the tracked signals onto a signal synthesis and decoding unit 100 which decodes the tracked signal and creates a display signal. An output device 110 may be a radar monitor which displays an image of the tracked sources for a user to view and analyze.

In the case of the present invention being employed in cellular telephone systems, each source transmits radiation signals instead of reflecting radiation incident upon them. A base station may keep track of the relative powers of mobile units and transmit accordingly to each in order to transmit a signal which may be easily received without overmodulating. Target detection unit 90 chooses a signal from a mobile unit that it is currently communicating with, and passes that signal to signal synthesis and decoding unit 100 which creates an audio signal and drives output device 110 such as a speaker system.

Output device 110 may alternatively be a digital computer that further processes the received signal, or a control device to actuate mechanisms such as navigational equipment on a ship to move the ship relative to the sensed sources.

In alternative embodiments signal synthesis and decoding unit 100 and output devices 110 will vary according to the intended use.

A simulation was conducted using the present invention as it would be employed in a radar system. A 16 element phased array with element spacing set at ½ the carrier wavelength was employed. The Rayleigh spatial frequency resolution for this array is equal to (1/16). The DOA angles are estimated using the Root-MUSIC algorithm which is capable of accurate DOA estimates of sources that differ by large amount of power. The power estimates in these simulations are made using the approximate relation described by Eq. 7 above.

Figure 3:
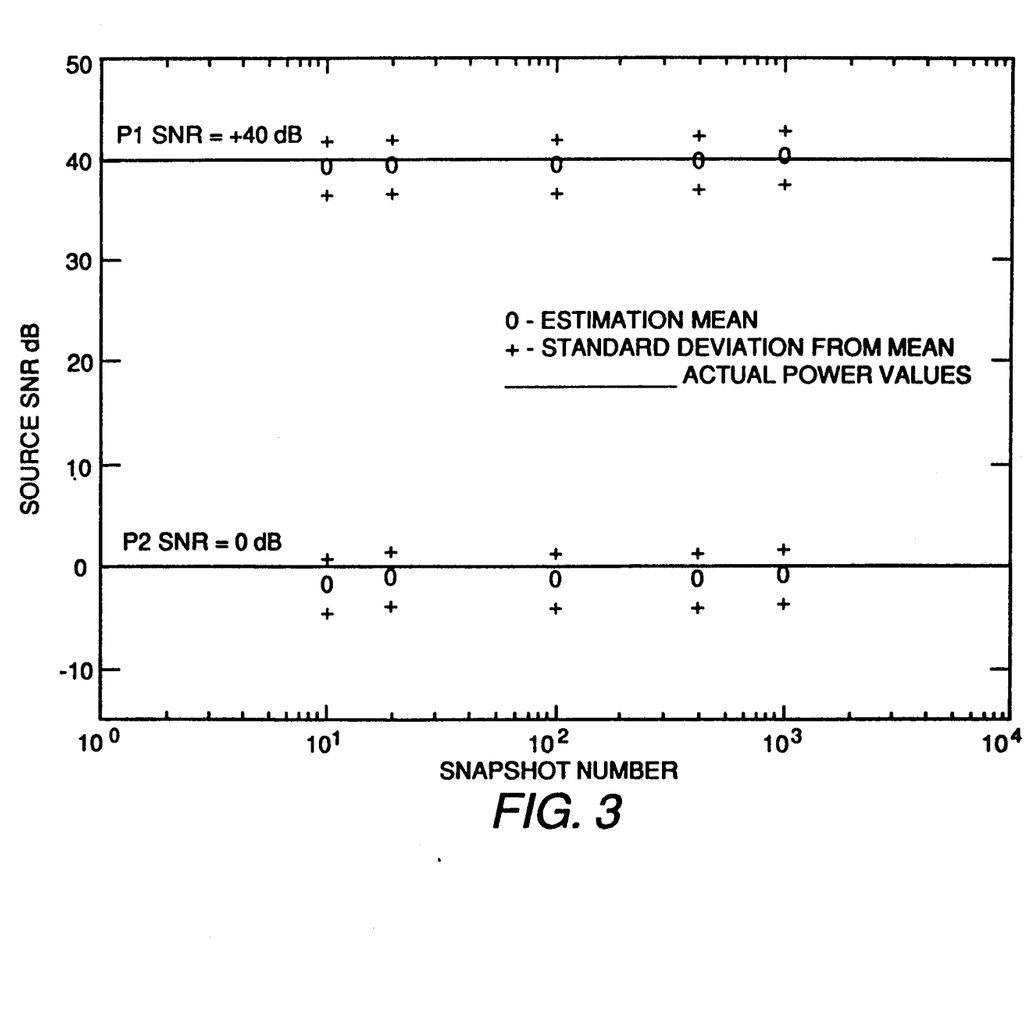
FIG. 3 is a logarithmic graph of statistical results for power estimates of two sources that differ in their signal to noise ratio by 40 dB as a function of the snapshot number.

FIG. 3 is a logarithmic graph of statistical results for power estimates employing the present invention as a function of the number of snapshots for the specific case of two point sources detected by the 16 element spatial phased array. The point source model is a good representation for radar targets or rf communication sources such as a cellular telephone source. The two sources have SNRs of 40 and 0 dB, and are separated in spatial frequency by ½ of the Rayleigh spatial frequency resolution. Statistics were accumulated using 100 independent runs for each of the snapshot orders indicated by the data points in the figures. The solid line represents the actual power values, circles signify the estimated mean calculated with the present invention and crosses signify the range of the standard deviation of the estimated means. An important aspect of the present invention is that the power estimates are accurate for a relatively small numbers of snapshots, down to approximately 10 snapshots.

Figure 4:
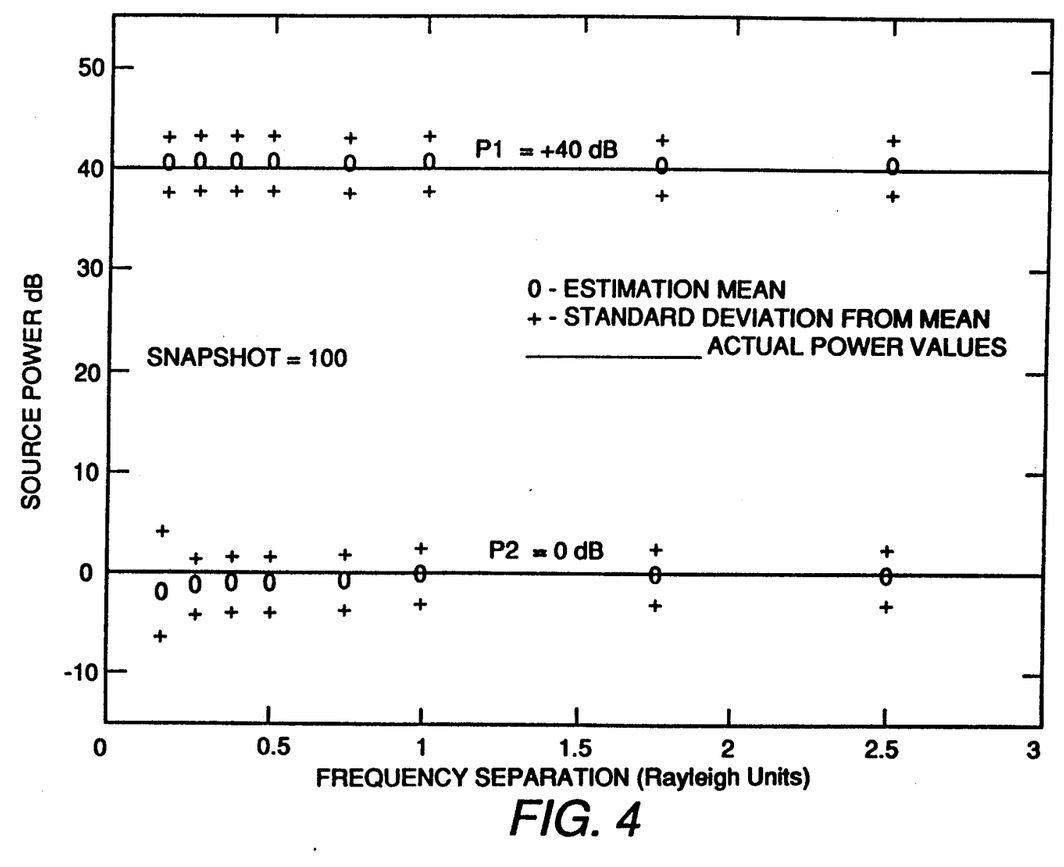
FIG. 4 is a logarithmic graph of statistical results for power estimates of two sources that differ in their signal to noise ratio by 40 dB as a function of angular separation in units of the Rayleigh resolution.

FIG. 4 is a logarithmic graph of statistical estimation results employing the present invention for two sources at variable angular separations. The source power levels are 40 and 0 dB. The weaker source estimates exhibits some deterioration, when source separations are less than 0.3 Rayleigh units.

Another simulation was performed with the simulation results given in Table 1 below.

TABLE 1

| Spatial Frequencies | | | | Source Powers dB | | | | Calculated Powers dB | | | |
|---|---|---|---|---|---|---|---|---|---|---|---|
| 5/16 | 5.5/16 | 6.3/16 | | 80 | 0 | 50 | | 80 | −2.4 | 50 | |
| 5/16 | 5.5/16 | 6.3/16 | | 60 | 0 | 0 | | 60 | −3.2 | −2.6 | |
| 5/16 | 5.5/16 | 6.3/16 | | 0 | 0 | 0 | | −3.6 | −3.6 | −2.3 | |
| 5/16 | 5.5/16 | 6.2/16 | 3.5/16 | 50 | 0 | 20 | 0 | 50 | −2.5 | 20 | −1.2 |
| 5/16 | 5.5/16 | 6.2/16 | 3.5/16 | 50 | 10 | 30 | 10 | 50 | 9.5 | 30 | 9.6 |
| 5/16 | 5.5/16 | 6.2/16 | 3.5/16 | 70 | 0 | 40 | 10 | 70 | −2.3 | 40 | 9.9 |

The top three rows of Table 1 are power estimate simulation results for three sources of differing power. The bottom three rows of Table 1 are power estimate simulation results for four sources of differing power. These simulations have been made with the 16 element linear array. The power estimates shown in the third column are excellent for high SNR sources. Low SNR source values exhibit some negative biasing effects, but may be used to identify different sources.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A source identification system which identifies and displays remote sources comprising:
   a) a plurality of M receive branches each having
      i. a phased array sensor for receiving a signal from said sources at a time index l,
      ii. a demodulator responsive to the phased array sensor for demodulating the received signal from the sensor,
      iii. an analog-to-digital (A/D) converter responsive to the demodulator for converting the demodulated signal to a digital value $x_i(n)$ at specific time periods indicated by a time index l, and n is an index for the phased array sensor which received the signal;
   b) a snapshot storage unit responsive to the receive branches for collecting a plurality of N snapshots with the digital values organized in a matrix format $X_N$, each snapshot being all the digital values $x_i(n)$ from the receive branches at a time represented by time index l;
   c) covariance generation unit responsive to the snapshot storage unit for calculating a set of sample covariance values $R_N$ from digital values $x_i(n)$ for the plurality of snapshots organized in the matrix format $X_N$;
   d) eigenanalysis processor responsive to the covariance generation unit for creating a set of eigenvalues and eigenvectors $\lambda_k \hat{e}_k$ from the sample covariance values $R_N$;
   f) a source number estimator responsive to the eigenanalysis processor for determining a number of sources d from the set of eigenvalues and eigenvectors $\lambda_k \hat{e}_k$;
   g) direction of arrival (DOA) processor responsive to the eigenanalysis processor and the source number estimator for determining a set of manifold vectors $a(\theta_i)$ indicating the direction of arrival $\theta_i$ of said remote sources from number of sources d and the set of eigenvalues and eigenvectors $\lambda_k \hat{e}_k$;
   h) power estimation processor responsive to the eigenanalysis processor and the DOA processor for creating a set of signal to noise estimates for each of said remote sources;
   i) target detection logic unit responsive to the power estimation processor and the DOA processor for identifying sources of interest to monitor based upon analyzing the source array manifold vectors $a(\theta_i)$, and signal to noise ratio (SNR) estimate $$\left(\frac{P(\theta_i)}{\sigma^2}\right)_{est};$$

j) a signal synthesis and decoding unit for decoding the identified signals and synthesizes a display signal; and
   k) an output device for creating an image representing the identified sources from the synthesized display signal.

2. The source identification system of claim 1 wherein the covariance generation unit comprises a means for calculating matrix elements of $R_N$ according to the equation:

$$R_N(m, n) = \frac{1}{N} \sum_{l=1}^{N} x_l(m) x_l^*(n)$$

where $x_l^*(n)$ represents the complex conjugate of the digitized values $x_l(n)$, m is the mth row and n is the nth column of a matrix of covariance values $R_N$.

3. The source identification system of claim 1 wherein the eigenanalysis processor comprises a means for creating noise and source eigenvalues and eigenvectors from the sample covariance matrix $R_N$ according to the equation:

$$R_N \hat{e}_k = \hat{\lambda}_k \hat{e}_k$$

where $\hat{\lambda}_1 \geq \ldots \hat{\lambda}_M$ are eigenvalues and $\hat{e}_1, \ldots, \hat{e}_M$ are the corresponding eigenvectors of $R_N$ and are an orthonormal set of basis vectors.

4. The source identification system of claim 1 wherein direction of arrival (DOA) processor comprises means for determining a set of array manifold vectors $a(\theta_i)$ by searching all possible array manifold vectors for array manifold vectors $a(\theta_i)$ which are most orthogonal to the noise eigenvectors.

5. The source identification system of claim 1 wherein direction of arrival (DOA) processor comprises means for determining a set of array manifold vectors $a(\theta_i)$ from the noise and source eigenvalues and eigenvectors by executing the steps of a conventional superresolution algorithm.

6. The source identification system of claim 1 wherein the power estimation processor comprises means for creating a set of signal to noise estimates $$\left(\frac{P(\theta_i)}{\sigma^2}\right)_{est}$$

for each of said remote sources by executing the steps of projecting each of said source array manifold vectors $a(\theta_i)$ onto a respective one of a noise eigenvectors $\hat{e}_k$ for $k = M - d + 1$ to M, summing projected vectors and determining an approximate signal to noise estimate according to the equation:

$$\left(\frac{P(\theta_i)}{\sigma^2}\right)_{est} = \frac{(M-d)}{MN} \frac{1}{D(\theta_i)}$$

where $$D(\theta_i) = \sum_{k=M-d+1}^{M} |a^H(\theta_i) e_k|^2,$$

d is the number of moving targets calculated from the source number estimator, $a^H(\theta_i)$ is the Hermitian conjugate of the source dwell manifold vectors, N is the number of uncorrelated snapshots and $\sigma^2$ is the mean noise power per phased array sensor.

7. The source identification system of claim 1 wherein the signal synthesis and decoding unit comprises means for creating a video signal from the identified signals, and the output device comprises a monitor which displays the video signal.

8. The source identification system of claim 1 wherein the signal synthesis and decoding unit is a speech synthesizer and the output device is a speaker which plays the audio signal.

9. The source identification system of claim 1 wherein the signal synthesis and decoding unit comprises means for decoding a digital signal from the identified signals, and the output device comprises a digital processor and storage unit for data collection and processing.

* * * * *